US009612161B2

(12) United States Patent
Capron et al.

(10) Patent No.: US 9,612,161 B2
(45) Date of Patent: Apr. 4, 2017

(54) PHASE MEASUREMENT BY PHASE TRANSFER

(71) Applicant: The Boeing Company, Chicago, IL (US)

(72) Inventors: Barbara A. Capron, Sammamish, WA (US); Benjamin E. C. Koltenbah, Federal Way, WA (US); Claudio G. Parazzoli, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 329 days.

(21) Appl. No.: 14/601,516

(22) Filed: Jan. 21, 2015

(65) Prior Publication Data

US 2016/0209274 A1   Jul. 21, 2016

(51) Int. Cl.
*G01N 21/35* (2014.01)
*G01N 21/64* (2006.01)
*G01J 9/00* (2006.01)
*G01J 1/04* (2006.01)

(52) U.S. Cl.
CPC ............... *G01J 9/00* (2013.01); *G01J 1/0429* (2013.01)

(58) Field of Classification Search
CPC ...... G01N 21/35; G01N 21/636; G01N 21/64; G01J 9/00; G01J 1/0429
USPC ................................................... 250/339.07
See application file for complete search history.

(56) References Cited

U.S. PATENT DOCUMENTS

| 7,274,440 B1 * | 9/2007 | Janik ................. G01J 3/021 356/33 |
| 9,557,262 B2 * | 1/2017 | Zeilinger ............... G01N 21/35 |
| 2005/0206904 A1 * | 9/2005 | Zaugg .................. B82Y 20/00 356/451 |

OTHER PUBLICATIONS

Lemos et al., "Quantum imaging with undetected photons", Research Letter, Nature, vol. 512, Aug. 28, 2014, pp. 409-415.

\* cited by examiner

*Primary Examiner* — Seung C Sohn
(74) *Attorney, Agent, or Firm* — MH2 Technology Law Group LLP

(57) ABSTRACT

The present disclosure generally relates to techniques for measuring a phase difference between a first set of photons and a second set of photons. The techniques can include directing the first set of photons to a first parametric downconverter, directing the second set of photons to a second parametric downconverter, directing photons output from an exotic photon source to the first downconverter and directing photons output from the first parametric downconverter to a first beam splitter, directing photons output from an exotic photon source to the first beam splitter, directing photons output from the second parametric downconverter to a second beam splitter, directing photons output from the first beam splitter to the second beam splitter, detecting photons output from the second beam splitter, deriving, from the detecting, a phase difference between the first set of photons and the second set of photons, and outputting the phase difference.

20 Claims, 2 Drawing Sheets

PHASE MEASUREMENT BY PHASE TRANSFER

FIELD

This disclosure relates generally to photonic measurement.

BACKGROUND

Measuring a difference between phases of a first and second group of photons in a thermal beam is useful for a variety of purposes. Nevertheless, when the thermal beam has a low photon count, such measurement is complicated by the presence of quantum noise.

SUMMARY

According to some embodiments, a method for measuring a phase difference between a first set of photons and a second set of photons is presented. The method includes directing the first set of photons to a first parametric downconverter; directing the second set of photons to a second parametric downconverter; directing photons output from an exotic photon source to the first downconverter; directing photons output from the first parametric downconverter to a first beam splitter; directing photons output from an exotic photon source to the first beam splitter; directing photons output from the second parametric downconverter to a second beam splitter; directing photons output from the first beam splitter to the second beam splitter; detecting photons output from the second beam splitter; deriving, from the detecting, a phase difference between the first set of photons and the second set of photons; and outputting the phase difference.

Various optional features of the above embodiments include the following. The first set of photons may include photons emitted from a photon source, and the second set of photons may include photons emitted from the photon source and reflected off an object, where the method further includes detecting a speed of the object based on the phase difference. The first portion of photons and the second portion of photons may be emitted from a thermal source. The method may include imaging the thermal source based on the phase difference. The method may include directing photons from a pump beam to the first parametric downconverter and to the second parametric downconverter. The method may include directing photons output from the first beam splitter to an adjustable phase shifter. The detecting photons output from the second beam splitter may include counting photons in a first portion of the photons output from the second beam splitter and counting photons in a second portion of the photons output from the second beam splitter. The detecting photons output from the second beam splitter may include causing saturation of a Cramer-Rao bound. The method may include interposing a polarizing beam splitter between the first parametric downconverter and the first beam splitter. The method may include interposing a polarizing beam splitter between the second parametric downconverter and the second beam splitter.

According to some embodiments, a system for measuring a phase difference between a first set of photons and a second set of photons is presented. The system includes a first parametric downconverter configured to receive the first set of photons and photons output from an exotic photon source; a second parametric downconverter configured to receive the second set of photons; a first beam splitter configured to receive photons output from the first parametric downconverter and photons output from the exotic photon source; a second beam splitter configured to receive photons output from the second parametric downconverter and photons output from the first beam splitter; at least two photon detectors configured to detect photons output from the second beam splitter; at least one computer processor communicatively coupled to the at least two photon detectors and configured to derive a phase difference between the first set of photons and the second set of photons; and an output configured to provide the phase difference.

Various optional features of the above embodiments include the following. The first set of photons may include photons emitted from a photon source, and the second set of photons may include photons emitted from the photon source and reflected off an object, where the system further includes at least one computer processor configured to detect a speed of the object based on the phase difference. The first portion of photons and the second portion of photons may be emitted from a thermal source. The system may include at least one computer processor configured to image the thermal source based on the phase difference. The system may further include a pump beam configured to provide photons to the first parametric downconverter and to the second parametric downconverter. The system may include an adjustable phase shifter configured to receive photons output from the first beam splitter. The at least one computer processor may be further configured to count photons in a first portion of the photons output from the second beam splitter and to count photons in a second portion of the photons output from the second beam splitter. The system may be configured to cause saturation of a Cramer-Rao bound. The system may include a polarizing beam splitter interposed between the first parametric downconverter and the first beam splitter. The system may include a polarizing beam splitter interposed between the second parametric downconverter and the second beam splitter.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary implementations. These embodiments are described in sufficient detail to enable those skilled in the art to practice the disclosed subject matter and it is to be understood that other embodiments may be utilized and that changes may be made without departing from the disclosed scope. The following description is, therefore, merely exemplary.

According to some embodiments, a technique for measuring a relative phase difference between two sets of photons is presented. Such embodiments may include generating entangled photon pairs where the constituent photons are polarized in perpendicular directions. A phase measurement may be performed on a polarization mode that does not carry the phase information. The phase transfer may reduce intrinsic noise of a thermal beam.

Figure 1:
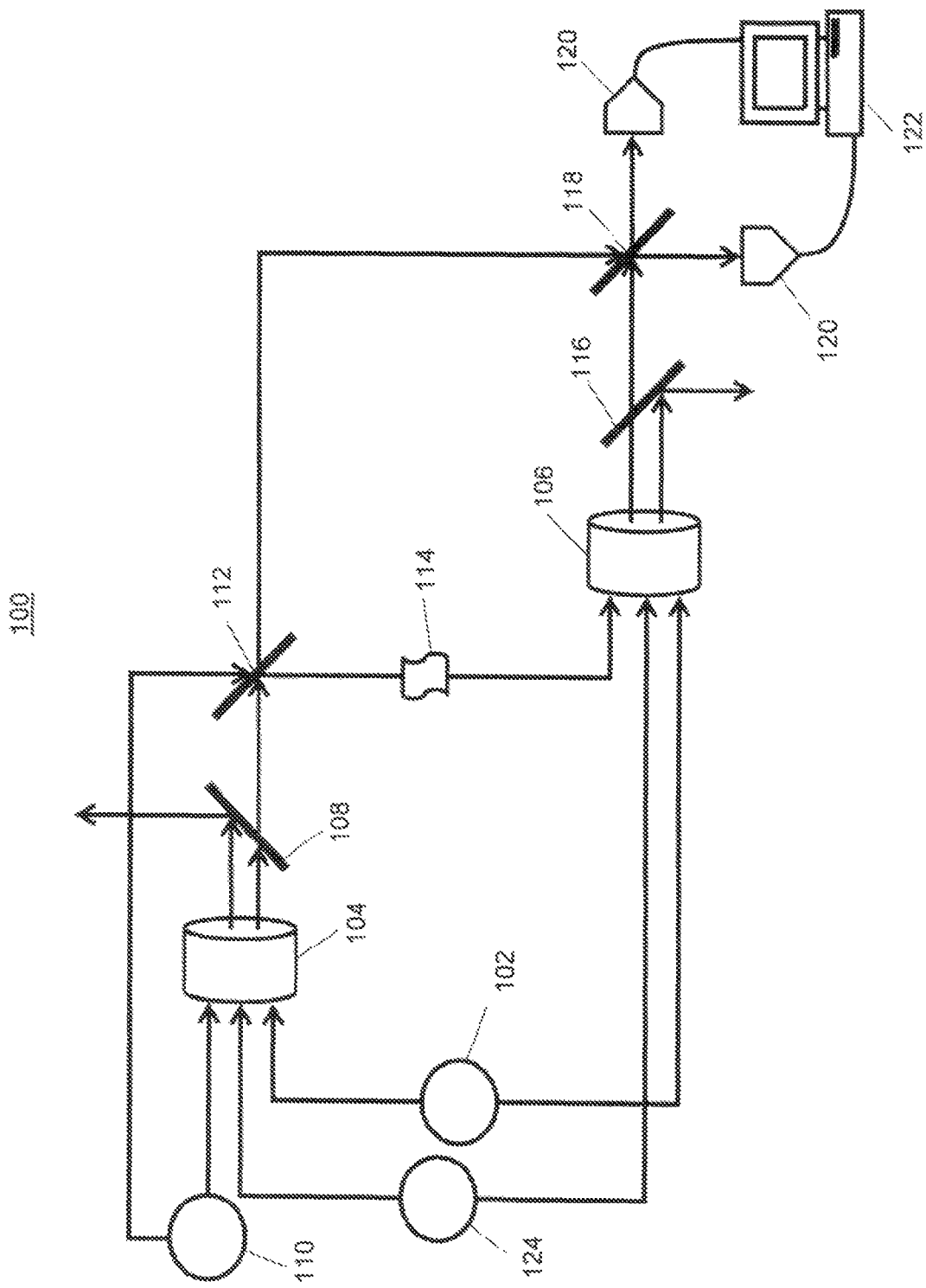
FIG. 1 is a schematic diagram of a system according to some embodiments.

FIG. 1 is a schematic diagram of a system 100 according to some embodiments. The system 100 depicted in FIG. 1 may be used to perform methods described herein. More particularly, system 100 may be used to measure a phase difference between two portions of photons generated by photon source 102. For ease of exposition, conventional mirrors are not depicted in FIG. 1 as is typical in such photonic diagrams.

Photon source 102 may be a thermal photon source, e.g., a star, a fire, or a black body. In general, photon source 102 may provide portions of photons to two respective portions of system 100. According to some embodiments, photon source 102 may be a source of coherent light, e.g., a laser. In such embodiments, a portion of photon source 102 may be directed to an object, and photons reflected from the object may be provided to a first portion of system 100, whereas photons from photon source 102 may be provided directly to a second portion of system 100.

As shown in FIG. 1, a first portion of photons from photon source 102 may be directed to first parametric downconverter 104, and a second portion of photons from photon source 102 may be provided to second parametric downconverter 106. In general, parametric downconverters 104, 106 may be optical elements capable of generating entangled photons. The constituent photons in an entangled photon pair may be polarized in parallel or perpendicular with respect to each-other. Further, parametric downconverters 104, 106 may be of Type I or Type II, known in the art. According to some embodiments, parametric downconverters 104, 106 may be beta barium borate, for example.

Pump beam 124 also provides photons to parametric downconverters 104, 106. Pump beam 124 may be coherent light, e.g., as produced by a laser. Pump beam may be of sufficient magnitude as to generate entangled photons in parametric downconverters 104, 106 when combined with the first and second portions of photons from photons source 102.

Exotic photon source 110 may provide any of a variety of exotic photons. According to some embodiments, exotic photon source 110 provides coherent or squeezed coherent light. According to some embodiments, exotic photon source 110 provides photons in a two-mode squeezed vacuum state. In general, exotic photon source 110 may be configured to have the same frequency, or approximately the same frequency, as an average frequency of photons from photon source 102. Further, exotic photon source 110 may provide up to about ten times the number of photons as are provided by photon source 102.

Photons from exotic photon source 110 may be directed to first parametric downconverter 104 and to first beam splitter 112. That is, a first portion of photons from exotic photon source 110 may be directed to first parametric downconverter 104, and a second portion may be directed to first beam splitter 112.

Photons emitted from first parametric downconverter 104 may include entangled photon pairs, e.g., where constituent photons in an entangled photon pair may be polarized in parallel or perpendicular orientations. The photons emitted from first parametric downconverter 104 may be directed to first polarizing beam splitter 108, which passes photons of one polarization and reflects photons of a perpendicular polarization. Alternate expedients may be used to separate photons polarized in parallel. The reflected photons may be dumped external to system 100. Photons that pass thorough first polarizing beam splitter 108 may be directed to first beam splitter 112.

In general, first beam splitter 112 and second beam splitter 118 may be 50% beam splitters. That is, first beam splitter 112 and second beam splitter 118 are configured to receive light at a 45° angle to their respective ports, reflect 50% of such light, and transmit 50% of such light. First beam splitter 112 and second beam splitter 118 may be half-silvered glass, for example.

Figure 2:
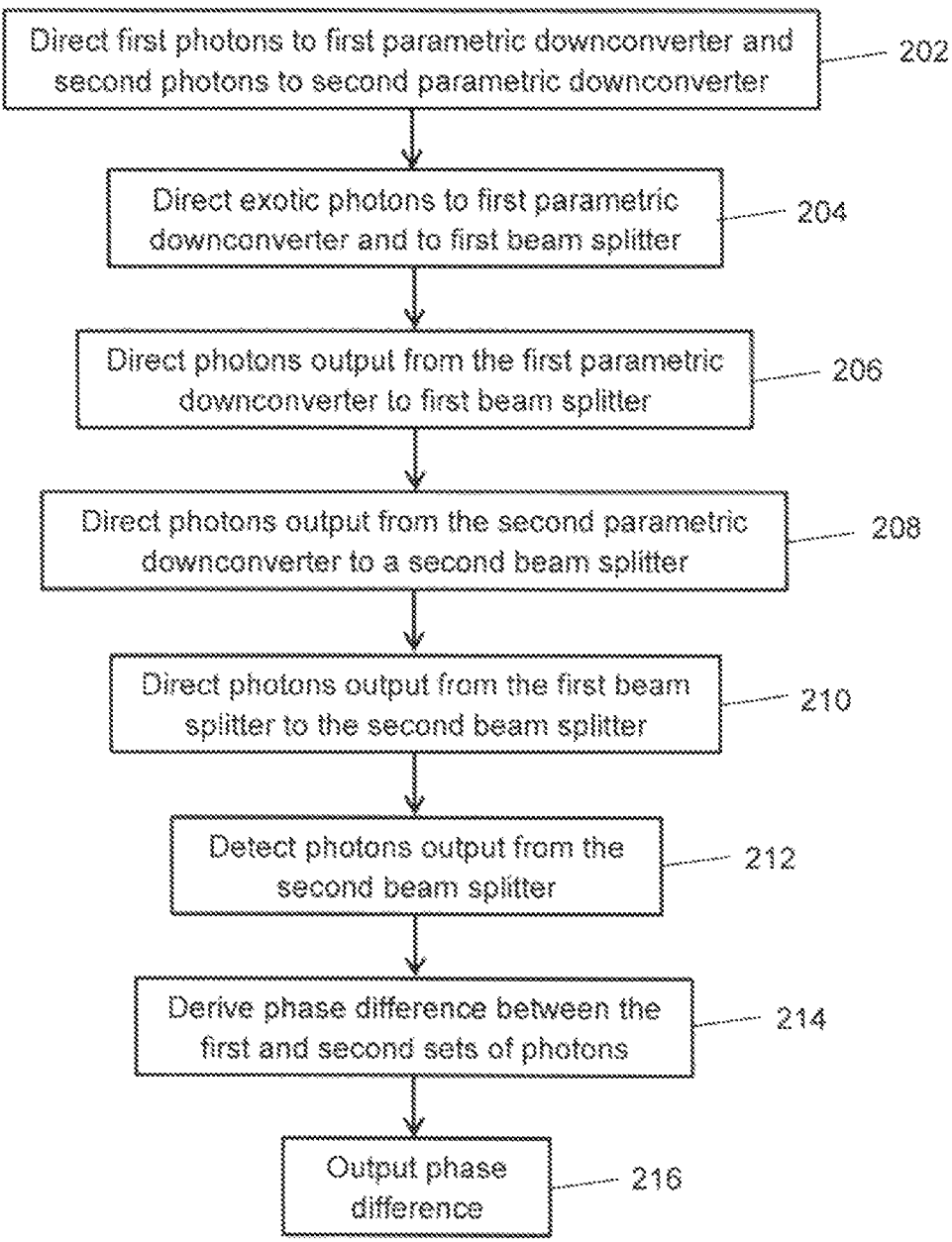
FIG. 2 is a flowchart of a method according to some embodiments.

Photons transmitted through first beam splitter 108, and photons from exotic photon source 110, may be directed at 45° angles to opposite sides of first beam splitter 112 as depicted in FIG. 2. Further, as shown in FIG. 2, photons output from first beam splitter 112 in a direction parallel to light from exotic photon source 110 may be directed to phase shifter 114, whereas photons output from first beam splitter 112 in a direction parallel to light from beam splitter 108 may be directed to second beam splitter 118.

Phase shifter 114 may be adjustable, e.g., manually adjustable, from 0° to 180°. Phase shifter 114 may be used to tune system 100 to provide a good signal. More particularly, phase shifter 114 may be adjusted to minimize or reduce a variance of the determined phase difference. Photons exiting phase shifter 14 may be directed to second parametric downconverter 106.

Second parametric downconverter 106 receives photons from phase shifter 114, pump beam 124 and photon source 102 and generate entangled photon pairs therefrom. The constituent entangled photons in an entangled photon pair may be polarized in parallel or perpendicular orientations. The photons emitted from second parametric downconverter 106 may be directed to second polarizing beam splitter 116; alternate expedients may be used to separate photons polarized in parallel. The reflected photons may be dumped external to system 100. Photons that pass thorough second polarizing beam splitter 116 may be directed to second beam splitter 118.

Photons transmitted through second beam splitter 118, and photons transmitted through first beam splitter 112 in a direction parallel to photons transmitted through first polarizing beam splitter 108, may be directed at 45° angles to opposite sides of second beam splitter 118 as depicted in FIG. 2. Further, as shown in FIG. 2, photons output from second beam splitter 118 may be directed to respective photon detectors 120.

Photon detectors 120 may be highly sensitive and capable of registering individual photons. Photon detectors 120 may be coupled to computer 122, which may be configured as a coincidence counter. Computer 122 may count individual photons registered at respective photon detectors 120 over a given time span. A comparison of such photon counts may be used to determine a relative phase difference between photons from respective portions of photon source 102.

FIG. 2 is a flowchart of a method according to some embodiments. The method of FIG. 2 may be practiced by using, e.g., the system shown and described herein in reference to FIG. 1. In particular, the method of FIG. 2 may be used to determine a phase difference between two portions of photons generated by photon source 102.

At block 202, first and second photon portions from a photon source, e.g., photon source 102, are directed to first and second parametric downconverters, e.g., first parametric downconverter 104 and second parametric downconverter 106, respectively. According to some embodiments, the first and second portions of photons are emitted from a thermal source, and the method includes imaging the thermal source. According to other embodiments, the first portion of photons include photons emitted from a photon source, and the second portion of photons include photons emitted from the photon source and reflected off an object. In such embodiments, the method may include detecting a speed of the object based on a determined phase difference.

At block 204, exotic photons, e.g., from exotic photon source 110, are directed to first and second downconverters, e.g., first parametric downconverter 104 and second parametric downconverter 106.

At block 206, photons output from the first parametric downconverter are directed to a first beam splitter, e.g., beam splitter 112 of FIG. 1. Some embodiments include interposing a polarizing beam splitter between the first parametric downconverter and the first beam splitter.

At block 208, photons output from the second parametric downconverter, e.g., second parametric downconverter 106 of FIG. 1, are directed to a second beam splitter, e.g., second beam splitter 118 of FIG. 1. Some embodiments include interposing a polarizing beam splitter between the second parametric downconverter and the second beam splitter.

At block 210, photons output from the first beam splitter are directed to the second beam splitter. According to some embodiments, the photons output from the first beam splitter are directed through an adjustable phase shifter, e.g., phase shifter 114 of FIG. 1, before being directed to the second beam splitter.

At block 212, photons output from the second beam splitter, e.g., as shown in FIG. 1, are directed to photon detectors, e.g., photon detectors 120 of FIG. 1. According to some embodiments, this block may further include counting photons in a first portion of the photons output from the second beam splitter and counting photons in a second portion of the photons output from the second beam splitter. The count may be performed after achieving saturation of a Cramer-Rao bound, e.g., by adjusting a phase shifter such as phase shifter 114 of FIG. 1.

At block 214, a phase difference between the first and second sets of photons is derived from the photon counts made by the photon detectors. In general, the phase difference may be proportional to the count ratio.

At block 216, the determined phase difference is output. The output may be made to a human-readable display, for example. As another example, the phase difference may be made to computing logic configured to determine a relative speed difference between objects due to a Doppler effect. Subsequently, the relative speed difference may be output, e.g., in human-readable form.

Certain embodiments can be performed in part as a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

Those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of measuring a phase difference between a first set of photons and a second set of photons, the method comprising:
   directing the first set of photons to a first parametric downconverter;
   directing the second set of photons to a second parametric downconverter;
   directing photons output from an exotic photon source to the first downconverter;
   directing photons output from the first parametric downconverter to a first beam splitter;
   directing photons output from an exotic photon source to the first beam splitter;
   directing photons output from the second parametric downconverter to a second beam splitter;
   directing photons output from the first beam splitter to the second beam splitter;
   detecting photons output from the second beam splitter;
   deriving, from the detecting, a phase difference between the first set of photons and the second set of photons; and
   outputting the phase difference.

2. The method of claim 1, wherein the first set of photons comprise photons emitted from a photon source, and wherein the second set of photons comprise photons emitted from the photon source and reflected off an object, the method further comprising detecting a speed of the object based on the phase difference.

3. The method of claim 1, wherein the first set of photons and the second set of photons are emitted from a thermal source.

4. The method of claim 3, further comprising imaging the thermal source based on the phase difference.

5. The method of claim 1, further comprising directing photons from a pump beam to the first parametric downconverter and to the second parametric downconverter.

6. The method of claim 1, further comprising directing photons output from the first beam splitter to an adjustable phase shifter.

7. The method of claim 1, wherein the detecting photons output from the second beam splitter comprises counting photons in a first portion of the photons output from the second beam splitter and counting photons in a second portion of the photons output from the second beam splitter.

8. The method of claim 1, wherein the detecting photons output from the second beam splitter comprises causing saturation of a Cramer-Rao bound.

9. The method of claim 1, further comprising interposing a polarizing beam splitter between the first parametric downconverter and the first beam splitter.

10. The method of claim 1, further comprising interposing a polarizing beam splitter between the second parametric downconverter and the second beam splitter.

11. A system for measuring a phase difference between a first set of photons and a second set of photons, the system comprising:
- a first parametric downconverter configured to receive the first set of photons and photons output from an exotic photon source;
- a second parametric downconverter configured to receive the second set of photons;
- a first beam splitter configured to receive photons output from the first parametric downconverter and photons output from the exotic photon source;
- a second beam splitter configured to receive photons output from the second parametric downconverter and photons output from the first beam splitter;
- at least two photon detectors configured to detect photons output from the second beam splitter;
- at least one computer processor communicatively coupled to the at least two photon detectors and configured to derive a phase difference between the first set of photons and the second set of photons; and
- an output configured to provide the phase difference.

12. The system of claim 11, wherein the first set of photons comprise photons emitted from a photon source, and wherein the second set of photons comprise photons emitted from the photon source and reflected off an object, wherein the system further comprises at least one computer processor configured to detect a speed of the object based on the phase difference.

13. The system of claim 11, wherein the first set of photons and the second set of photons are emitted from a thermal source.

14. The system of claim 13, further comprising at least one computer processor configured to image the thermal source based on the phase difference.

15. The system of claim 11, further comprising a pump beam configured to provide photons to the first parametric downconverter and to the second parametric downconverter.

16. The system of claim 11, further comprising an adjustable phase shifter configured to receive photons output from the first beam splitter.

17. The system of claim 11, wherein the at least one computer processor is further configured to count photons in a first portion of the photons output from the second beam splitter and to count photons in a second portion of the photons output from the second beam splitter.

18. The system of claim 11, further configured to cause saturation of a Cramer-Rao bound.

19. The system of claim 11, further comprising polarizing beam splitter interposed between the first parametric downconverter and the first beam splitter.

20. The system of claim 11, further comprising a polarizing beam splitter interposed between the second parametric downconverter and the second beam splitter.

* * * * *